Sept. 7, 1965
M. E. WALBERG
3,204,984
FLEXIBLE WEIGHT TRANSFER TRACTOR HITCH
Filed July 1, 1963
3 Sheets-Sheet 1
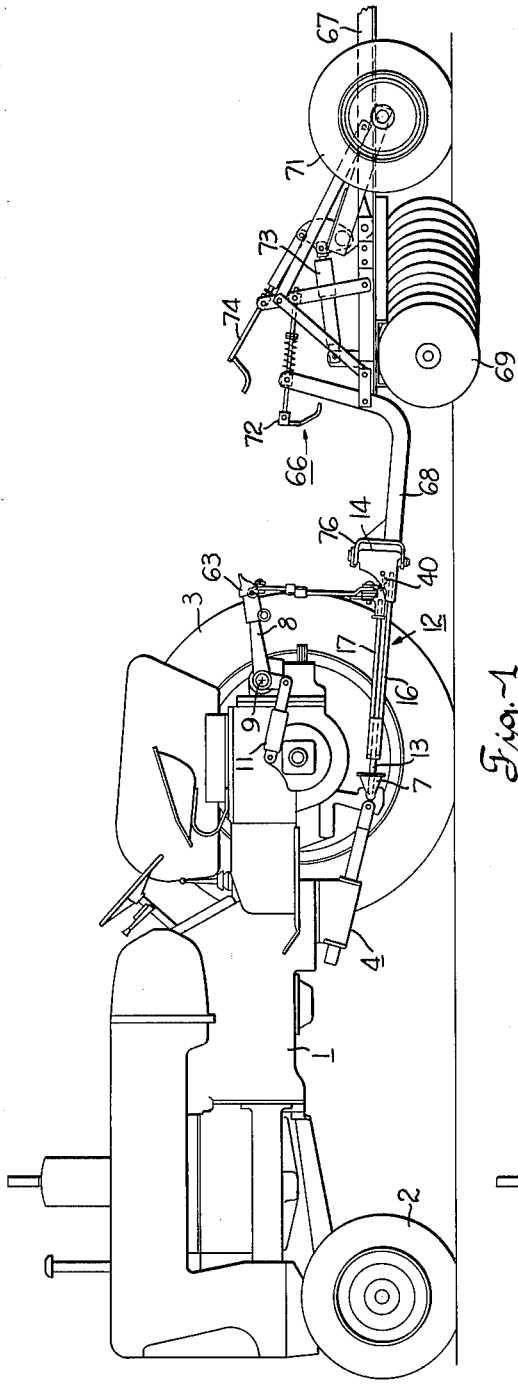
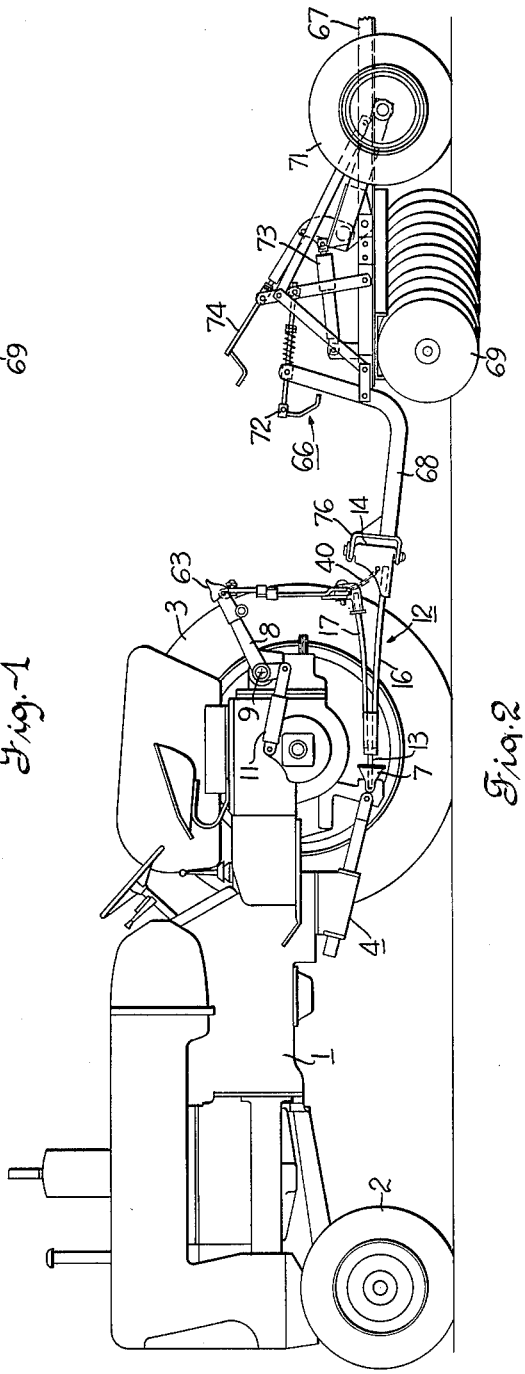
Inventor
Maynard E. Walberg
By
Attorney

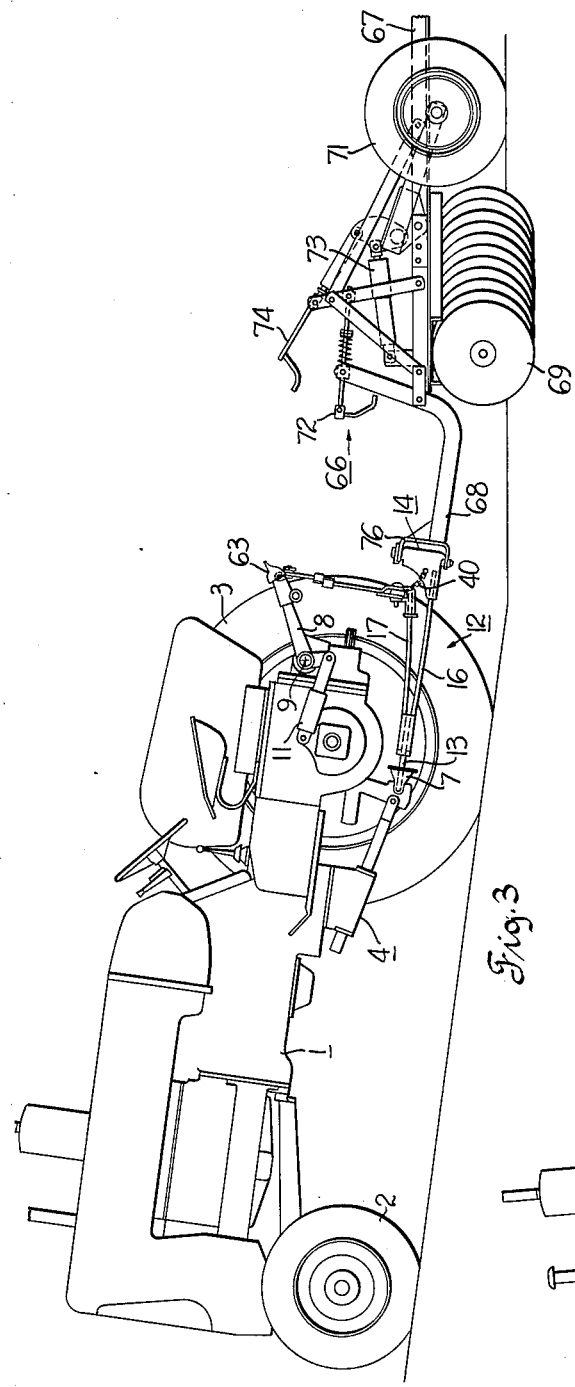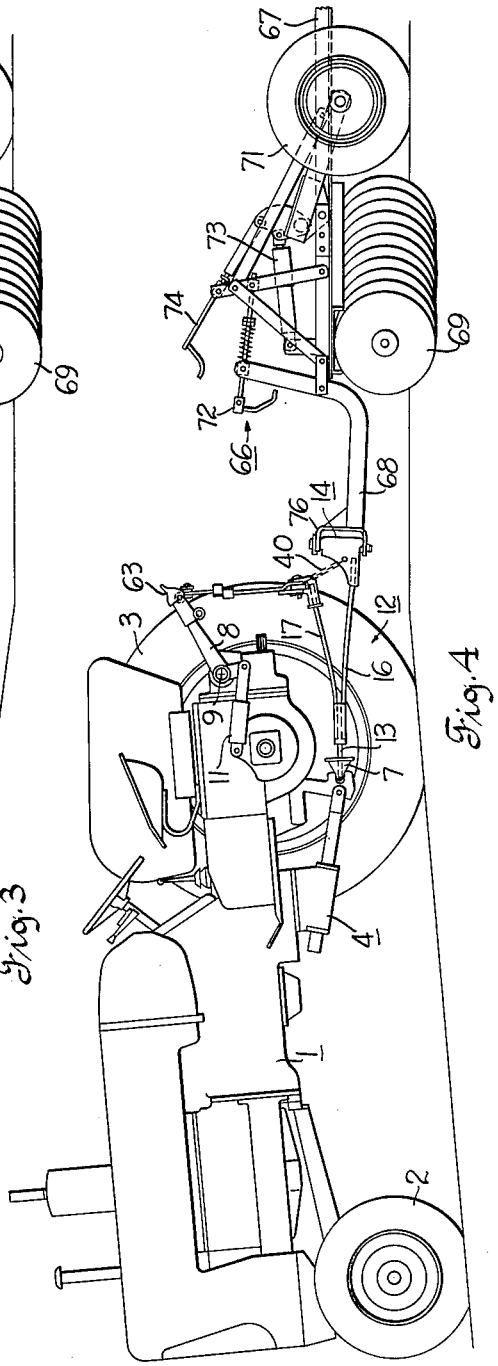

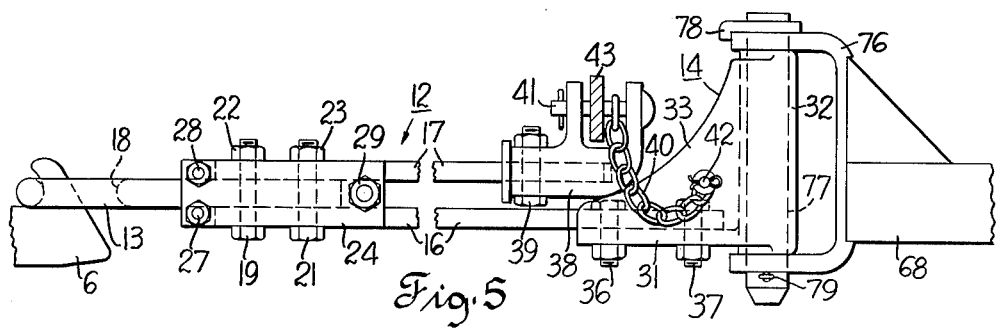
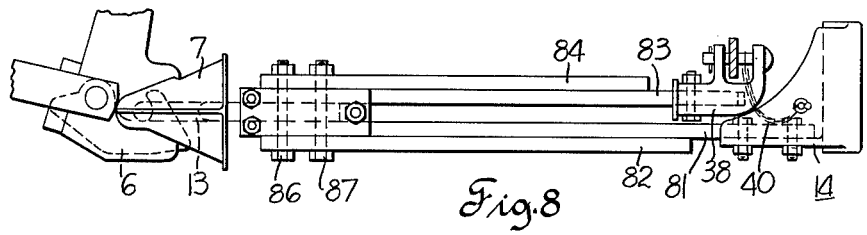
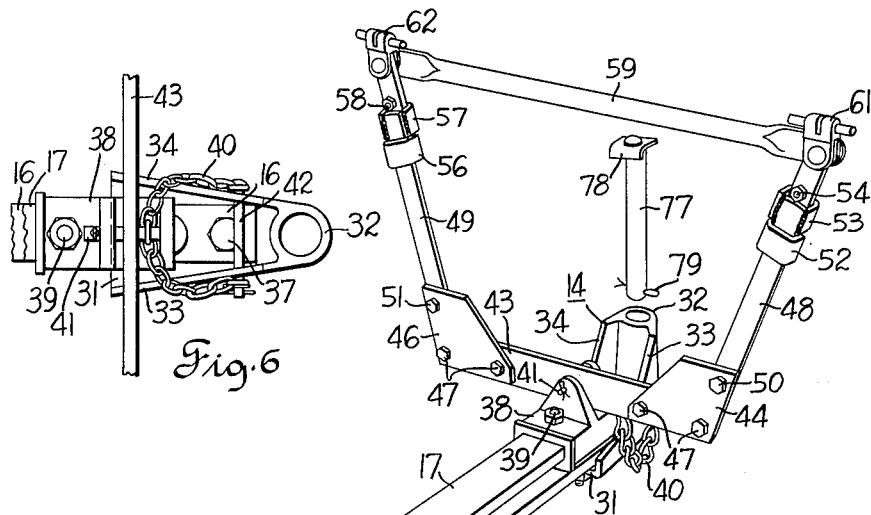
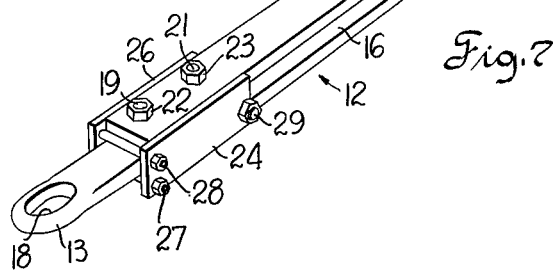

United States Patent Office 3,204,984
Patented Sept. 7, 1965

3,204,984
FLEXIBLE WEIGHT TRANSFER TRACTOR HITCH
Maynard E. Walberg, West Salem, Wis., assignor to Allis-Chalmers Manufacturing Company, Milwaukee, Wis.
Filed July 1, 1963, Ser. No. 291,796
11 Claims. (Cl. 280—405)

The invention relates to tractor hitches, and it is concerned more particularly with a hitch for connecting an agricultural implement, such as a plow or harrow, in drawn and weight transferring relation to a tractor.

Farm tractors are commonly equipped with a draft transmitting coupling element at their underside and with a power lift mechanism at the rear, including an up and down swingable pair of lift arms. Hitch devices for use in connection with tractors of this type have heretofore been suggested which serve the dual function of transmitting draft from the tractor to a trailing implement and of transmitting weight from the implement to the tractor when needed for increased traction. As disclosed, for instance, in U.S. Patent 2,930,630, granted March 29, 1960, to W. H. Tanke, such a hitch device as heretofore known includes a draft tongue which is pivotally connectable at its forward end with the underside of the tractor and which is connectable at its rear end in vertically rigid, horizontally swingable relation with a trailing implement. At its rear end the drawbar also has a lift force transmitting connection with the power lift arms on the tractor. For weight transfer purposes the connection between the drawbar and the power lift arms is preferably constructed so as to yield resiliently to the application of lifting force. The provision of a resiliently yieldable lift connection for the drawbar permits transfer of weight from the implement to the tractor without actually raising the implement.

Draft and weight transmitting tractor hitches of the mentioned character as heretofore known have not been entirely satisfactory in several respects. One of the difficulties which has been encountered has been breakage of hitch parts under severe operating conditions, as during propulsion of the tractor and implement on uneven ground and simultaneous weight transfer from the implement to the tractor for increased traction. Another difficulty encountered with prior art hitches of the mentioned character has been a change of working depth of the implement when the tractor assumes an upwardly or downwardly inclined position relative to the implement during travel on uneven ground while the power life mechanism is operative at the same time to transfer weight from the implement to the tractor.

Generally, it is an object of the present invention to provide an improved draft and weight transmitting tractor hitch which avoids the shortcomings of the prior art hitches in a practical and entirely satisfactory manner.

More specifically, it is an object of the invention to provide an improved draft and weight transmitting tractor hitch of a design which lends itself for use in connection with large tractors and correspondingly large implements, as for instance tractors rated at eighty or more engine horsepower and tandem disk harrows with a cutting width of ten or twelve feet.

A further object of the invention is to provide an improved heavy duty tractor hitch of the mentioned character which will be capable of transmitting considerable weight from an implement to a tractor but which will have the necessary vertical flexibility to avoid overstressing or breakage of parts under severe operating conditions as when the tractor and implement are traveling over uneven ground while the tractor power lift mechanism is operative to transmit a considerable amount of weight from the implement to the tractor for increased traction.

A further object of the invention is to provide an improved tractor hitch of the hereinbefore mentioned character which is simple and compact in construction, efficient in operation, and which may be manufactured at relatively low costs.

These and other objects and advantages are attained by the present invention, various novel features of which will be apparent from the description herein and will be pointed out more particularly in the appended claims.

In the accompanying drawings:

FIGS. 1, 2, 3 and 4 are side elevations of a tractor and attached disk harrow under various operating conditions, the near rear wheel and fender of the tractor being omitted for purposes of exposing parts of the tractor hitch and power lift mechanism;

FIG. 5 is a partial side elevation, on an enlarged scale, of the hitch shown in FIG. 1, the overall length of the hitch being reduced by breaking out portions intermediate its ends;

FIG. 6 is a top view of rear parts of the hitch shown in FIG. 5;

FIG. 7 is a perspective, partly exploded, view of the hitch shown in FIG. 1; and FIG. 8 is a side elevation of a modification of the hitch shown in FIG. 5.

The tractor shown in FIGS. 1 to 4 is a farm tractor of conventional construction and comprises a main body 1 supported on steerable front wheels 2 and rear traction wheels 3. At the underside of the main body 1 the tractor is equipped with a draft sensing coupling device generally designated by the reference character 4 and which includes a draft hook 6 (FIG. 5) within a bell housing 7. At the rear of the main body 1 the tractor is equipped with a pair of power lift arms 8 which are movable up and down about a pivot axis 9 by means of a hydraulic ram 11. The coupling device 4, power lift arms 8 and ram 11 are part of a known weight transfer system which is disclosed, for instance, in U.S. Patent 2,779,604, granted January 29, 1957, to W. L. Voegeli, for Traction Boosting System for Tractors.

Connected to the draft hook 6 and to the power lift arms 8 is a draft and weight transmitting hitch assembly generally designated by the reference character 12 and best shown in its entirety in FIG. 7. The hitch assembly 12 comprises a forward coupling element 13 adapted for connection in vertically swingable relation with the draft hook 6; a rearward coupling element 14 adapted for connection in draft transmitting, vertically rigid and horizontally swingable relation with a drawn, ground engaging structure, as will be more fully explained hereinbelow; a first elongated, vertically deflectable and horizontally rigid spring element 16 rigidly connected at its opposite ends with the forward and rearward coupling elements 13 and 14, respectively; a second elongated, vertically deflectable and horizontally rigid spring element 17 rigidly connected at one end thereof with the forward coupling element 13 and extending rearwardly therefrom in overlying relation to the first spring element 16; and means connected in lift force transmitting relation with the rear end of the second spring element 17 for transmitting lifting power thereto from the tractor mounted power lift arms 8.

The forward coupling element 13 is forged from rectangular steel bar stock and has an oblong opening 18 in its forward end providing a hitch eye. The opening 18 extends between the flat sides of the bar 13 so that the latter will face broadside up when it is placed over the hook 6 as shown in FIGS. 1 and 5.

In the embodiment of the invention as shown in FIGS. 5 and 7, the first elongated, vertically deflectable and horizontally rigid spring element 16, and the second elongated, vertically deflectable and horizontally rigid spring element 17, are each made of steel bar stock of rectangular cross section. The rearward rectangular portion of the coupling element 13 is sandwiched between the forward ends of the rectangular spring bars 16 and 17, and a pair of bolts 19 and 21 extend through aligned holes in the bars 13, 16 and 17. Nuts 22 and 23 on the bolts 19 and 21, respectively, are drawn up to firmly clamp the coupling element 13 between the forward ends of the spring bars 16 and 17. For increased lateral rigidity the forward portions of the spring bars 16 and 17 are flanked by two vertical plates 24 and 26 which are firmly drawn against the horizontally opposite edges of the bars 13, 16 and 17 by horizontal bolts and nuts thereon, 27, 28 and 29.

The rearward coupling element 14 is made as a casting and has a horizontal web 31 (FIG. 5), a vertical barrel portion 32 and rearwardly converging vertical flanges 33 and 34 (FIG. 6) connecting the web 31 with the barrel portion 32. The rear end of the spring bar 16 extends over the web 31 of the casting 14 and is rigidly secured thereto by two bolts 36, 37 and associated nuts.

In the installed condition of the hitch assembly 12 on a tractor as shown in FIG. 1 the spring bar 16 extends broadside up from the coupling bar 13 in a rearward direction, and the spring bar 17 likewise extends broadside up from the coupling bar 13 in overlying relation to the spring bar 16. As shown in FIGS. 5 and 7, the rear end of the spring bar 17 is socketed in a clevis casting 38 and is secured therein by a bolt 39 and associated nut.

Operatively interposed between the spring bars 16 and 17 is a lost motion connection in the form of a chain 40 which, as illustrated by FIG. 4, limits downward and upward deflections, respectively, of the spring bars from their unstressed conditions in which they are shown in FIG. 1. The chain 40 is anchored midway between its ends on the clevis casting 38 by means of a pivot pin 41, and the opposite ends of the chain are anchored on the rearward coupling element 14 by means of a cross pin 42 as shown by FIGS. 5 and 6.

A transverse lift bar 43 is connected at its middle to the clevis casting 38 by the pivot pin 41 which extends through upstanding ears of the clevis casting and has a head at one end and a cotter pin at the other to hold it in place. Plates 44 and 46 are rigidly secured to the outer ends of the lift bar 43 by bolts 47. Telescopic lift links 48 and 49 are pivotally secured at their lower ends to the plates 44 and 46 by bolts 50 and 51, respectively, and extend upwardly in diverging directions for connection with the laterally spaced power lift arms 8 of the tractor. The lift links 48 and 49 are shown in a locked condition in which they are rigid, extension of the link 48 being prevented by relatively abutting collars 52, 53, and contraction of the link 48 being prevented by a stop bolt 54. Extension and contraction of the link 49 is similarly prevented by abutting collars 56, 57 and by a stop bolt 58. A spacer bar 59 extends between the upper ends of the locked lift links 48, 49, and knuckle pieces 61 and 62 are pivotally connected with the upper ends of the rigid lift links and with the opposite ends of the spacer bar. The knuckle pieces are engageable with and disengageable from suitably constructed coupling devices 63 at the outer ends of the power lift arms 8. The coupling devices 63 and associated knuckle pieces 61, 62 are of conventional construction, and their detail construction is more fully disclosed, for instance, in U.S. Patent 2,834,277, granted May 13, 1958, to W. H. Tanke, for Quick Hitch System. Cooperative engagement of the knuckle pieces 61, 62 with the coupling devices 63 at the outer ends of the power lift arms 8, pivotally connects the upper ends of the lift links 48, 49 with the outer ends of the tractor power lift arms 8 for up and down movement therewith about the transverse pivot axis 9 on the tractor.

The reference character 66 generally designates the forward part of a conventional tandem disk harrow, including a frame 67, a drawbar 68, front disks 69 and supporting wheels 71. A beaming crank 72 operatively connects the rearward upper end of the generally L-shaped drawbar 68 with a fixed point on the frame 67; a hydraulic ram 73 is suitably connected with the supporting wheels 71 for up and down adjustment of the latter, and a depth stop for the wheels 71 is adjustable by a crank 74, all in conformity with well established principles of construction and operation. The harrow includes a rear gang of disks, not shown, and it generally represents a drawn, ground engaging structure to which the rearward coupling element 14 of the hitch 12 is connected in draft transmitting, vertically rigid and horizontally swingable relation as shown in FIG. 1.

The forward end of the drawbar 68 has a coupling fork 76 which is integrally united, as by welding, with the fore and aft extending beam portion of the drawbar and which presents an upper and a lower prong in straddling relation to the barrel portion 32 of the coupling member 14. A coupling pin 77, shown separately in FIG. 7, extends through aligned holes in the upper and lower prongs of the coupling fork 76 and through the bore of the barrel portion 32, thereby affording the mentioned draft transmitting, vertically rigid and horizontally swingable connection between the coupling member 14 of the hitch 12 and the harrow 66. The coupling pin 77 has an overhanging lip 78 (FIG. 7) at its upper end which bears against the coupling fork 76 at the front edge of its upper prong and keeps the pin from turning in the aligned upper and lower holes of the coupling fork. A cotter pin 79 in the lower end of the pin 77 releasably secures it in installed position.

FIG. 1 shows the tractor and harrow in working condition on level ground, the weight transfer system of the tractor being inoperative to transfer weight from the harrow to the tractor. In this condition of the equipment, the power lift arms 8 are in a lowered position, the lower spring bar 16 transmits the entire draft load but transmits substantially no vertical load upon the draft hook 6. The upper spring bar 17 likewise carries no substantial vertical load, and both spring bars may be considered as being in a normal unstressed condition. The chain 40 is slack between the pins 41 and 42.

FIG. 2 shows the tractor and harrow in working condition on level ground and the tractor power lift arms adjusted upwardly from the lowered position in which they are shown in FIG. 1. The upward adjustment of the power lift arms may be automatically effected by the weight transfer system of the tractor in accordance with well known principles. As pointed out hereinbefore, the weight transfer system includes the draft sensing device 4, and when the draft sensed by this device increases beyond a preselected value pressure oil is automatically admitted to the tractor mounted ram 11 which then becomes effective to swing the power lift arms 8 upward. As a result, the upper spring bar 17 will tend to swing the forward coupling element 13 anticlockwise about its pivotal connection with the draft hook 6, and such anticlockwise swinging tendency of the coupling element 13 will be opposed by the weight component of the harrow which bears downwardly upon the rearward coupling element 14 of the hitch 12 through the coupling fork 76. A lift force is thus transmitted from the tractor power lift arms 8 to the harrow at its vertically rigid connection with the coupling member 14, and upon sufficient increase of this lift force, not only the upper spring bar 17 will deflect upwardly from its unstressed condition in which it is shown in FIG. 1, but the lower spring bar 16 will also deflect from the condition in which it is shown in FIG. 1, the deflection of the lower spring bar being downwardly and causing the lower spring bar to assume an upwardly arched condition as illustrated by FIG. 2.

The vertical deflection characteristics of the spring bars 16 and 17 are such that upward swinging movement of the power lift arms 8 from their FIG. 1 to their FIG. 2 position will be accommodated by deflection of the spring bars without appreciable upward displacement of the harrow frame, and so that a substantial amount of weight will be transferred from the harrow to the tractor by such upward swinging movement of the power lift arms 8 and accompanying deflection of the spring bars 16 and 17. Consequently, the cutting depth of the harrow will not be materially reduced by operation of the weight transfer system as long as the draft sensed by the draft sensing device 4 does not exceed the preselected value to which it has been adjusted. In the event that the draft sensed by the device 4 should exceed the preselected value, the ram 73 on the harrow will become automatically effective to decrease the cutting depth of the harrow by downward adjustment of the harrow supporting wheels 71.

FIG. 2 shows the power lift arms 8 swung to their upward limit position and the spring bars 16 and 17 deflected so as to transfer a predetermined maximum amount of weight from the harrow to the tractor. Under these conditions some, but not all, of the slack of the chain 40 is taken up as illustrated by FIG. 2.

FIG. 3 shows the tractor and harrow in working condition on uneven ground and the tractor power lift arms 8 adjusted to their upward limit position the same as in FIG. 2. As shown in FIG. 3, the tractor is ascending an uphill grade and the harrow is following the tractor in cutting condition on level ground. Adjustment of the power lift arms 8 to their upper limit positions when the tractor is tilted upwardly relative to the harrow as shown in FIG. 3 causes deflection of the lower and upper spring bars 16 and 17 from the condition in which they are shown in FIG. 1. The upper spring bar 17 in FIG. 3 is deflected upwardly and, as in FIG. 2, tends to pivot the forward coupling element 13 anticlockwise about its connection with the draft hook 6. The anticlockwise swinging tendency of the coupling element 13 is resisted by the lower spring bar 16 and subjects the latter to a bending load which tends to raise the rearward coupling element 14. At the same time, the lower spring bar 16 becomes subjected to a bending load in the opposite direction which tends to lower the forward coupling element 13, such opposite bending load being produced by the relative angular displacement of the tractor and harrow in a vertical direction as shown in FIG. 3. As a result, the lower spring bar 16 assumes a condition of compound deflection in which it is curved generally downward intermediate its ends, rather than upward as in FIG. 2. It will be noted that under the conditions illustrated by FIG. 3 the vertical flexibility of the lower spring bar 16 has the effect of relieving the forward disk gangs 69 from excessive downward pressure. As a result, the hazard of breakage of any of the parts through which weight is transferred from the harrow to the tractor under the conditions shown in FIG. 3 is greatly reduced. The compound flexing of the lower spring bar 16 does not increase the draft load and therefore does not cause actuation of the harrow ram 73 to lower the wheels 71 when the operating conditions illustrated by FIG. 2 change to those illustrated by FIG. 3. Under the conditions illustrated by FIG. 3 some, but not all, of the slack of chain 40 is taken up.

FIG. 4 shows the tractor in a position of downward angular displacement relative to the harrow, and the power lift arms 8 adjusted to their upward limit position the same as in FIGS. 2 and 3. Under the conditions illustrated by FIG. 4, the lower spring bar 16 is again subject to compound flexing due to the transfer of weight from the harrow to the tractor and the relative vertical angular displacement of the tractor and harrow. As shown in FIG. 4, the lower spring bar 16 is curved generally upward intermediate its ends, and the upper spring bar 17 is deflected upwardly to an extent which will take up all the slack of the chain 40. The relatively long rearwardly extending harrow frame 67 and its associated drawbar 68, which are connected in vertically rigid relation to each other, exert an upward force upon the hitch 12, and the upper spring bar 17 is held against upward movement by the lift links 48, 49 which are now in compression causing the longer lower spring bar 16 to arch upwardly, as shown in FIG. 4. Here again the flexibility of the lower spring bar 16 protects the parts through which weight is transferred from the harrow to the tractor, from undue stresses which might cause breakage. The chain 40 protects the spring bars 16 and 17 against excessive deflection when the tractor assumes a downward inclination relative to harrow greater than shown in FIG. 4.

In the modified embodiment of the invention shown in FIG. 8, the upper and lower springs are laminated rather solid as in FIG. 5. As shown in FIG. 8, a main leaf 81 is rigidly connected at its opposite ends with the forward and rearward coupling elements 13 and 14, respectively; and an auxiliary leaf 82 extends lengthwise below the main leaf 81. Above the main leaf 81 and spaced therefrom by the forward coupling element 13, another main leaf 83 and overlying auxiliary leaf 84 extend rearwardly from the coupling element 13. A pair of bolts 86 and 87 extend through aligned holes in the forward ends of the main and auxiliary leaves 81, 82, 83, 84 and in the coupling element 13, and nuts on the bolts 86, 87 are drawn up to secure the parts together. The clevis casting 38 is secured to the rear end of the upper main leaf 83 in the same manner as has been explained hereinbefore in connection with the upper spring bar 17 shown in FIG. 5.

The lower main leaf 81 and the upper main leaf 83 may be duplicates, respectively, of the upper and lower spring bars 16 and 17 shown in FIG. 5. The auxiliary leaves 82 and 84 in cooperation with the main leaves 81 and 83 adapt the hitch shown in FIG. 8 for use under conditions where the weight to be transferred from the implement to the tractor is extremely heavy. The use of auxiliary spring leaves rather than heavier solid springs under the mentioned conditions has the practical advantage that the same front and rear coupling elements and clevis casting can be used to provide hitches of different load carrying capacities. A hitch constructed as shown in FIG. 5 can readily be converted into the one shown in FIG. 8 with a minimum of expense, the only parts required being the auxiliary spring and longer bolts for clamping the front ends of the springs and front coupling element together if the existing bolts should be too short. Further, such conversion does not lessen the flexibility of the hitch although the converted hitch requires a larger force for full deflection. Solid upper and lower spring bars of increased thickness would have less potential flexibility and would fatigue quicker than the laminated upper and lower springs of the modified hitch shown in FIG. 8.

It should be understood that it is not intended to limit the invention to the details of construction herein shown and described and that the invention includes such other forms and modifications as are embraced by the scope of the appended claims.

The embodiments of the invention in which an exclusive property or privilege is claimed are defined as follows:

1. A hitch for use with a tractor having a draft transmitting coupling element and an up and down swingable power lift element mounted thereon, said hitch comprising:

a forward coupling element adapted for connection in vertically swingable relation with said tractor mounted coupling element;

a rearward coupling element adapted for connection in draft transmitting, vertically rigid relation with a drawn ground engaging structure;

a first elongated, vertically deflectable and horizontally rigid spring element rigidly connected at its opposite ends with said forward and rearward coupling elements, respectively;

a second elongated vertically deflectable and horizontally rigid spring element rigidly connected at one end thereof with said forward coupling element and extending rearwardly therefrom in overlying relation to said first spring element; and means connected in lift force transmitting relation with the rear end of said second spring element for transmitting lifting power thereto from said tractor mounted power lift element.

2. A hitch as set forth in claim 1 wherein said first and second spring elements are dimensioned and arranged so that both will be appreciably deflected vertically from their unstressed conditions upon transmission of lifting power therethrough from said tractor mounted power lift element to said drawn ground engaging structure while said forward coupling element is operatively connected with said tractor mounted coupling element.

3. A hitch as set forth in claim 1 wherein each of said first and second spring elements comprises a steel bar of rectangular cross section, and wherein each of said steel bars extends broad side up from said forward coupling element.

4. A hitch as set forth in claim 1 wherein said first spring element comprises a first steel bar of rectangular cross section extending broad side up from said forward coupling element, and wherein said second spring element comprises a second steel bar having a rectangular cross section substantially equal to the cross section of said first steel bar and extending broad side up from said forward coupling element.

5. A hitch as set forth in claim 1 wherein said first spring element comprises a main leaf and an underlying auxiliary leaf.

6. A hitch as set forth in claim 1 wherein said second spring element comprises a main leaf and an overlaying auxiliary leaf.

7. A hitch as set forth in claim 1 wherein said first spring element comprises a main leaf and an underlying auxiliary leaf, and wherein said second spring element comprises a main leaf and an overlying auxiliary leaf.

8. A hitch as set forth in claim 1 and further comprising lost motion connecting means operatively interposed between said first and second spring elements so as to limit downward and upward deflections, respectively, thereof from their unstressed conditions.

9. A hitch for use with a tractor having a draft transmitting coupling element and an up and down swingable power lift element mounted thereon, said hitch comprising:

a forward coupling element adapted for connection in vertically swingable relation with said tractor mounted coupling element;

a rearward coupling element adapted for connection in draft transmitting horizontally swingable and vertically rigid relation with a drawn ground engaging structure;

a first elongated vertically deflectable and horizontally rigid spring element rigidly connected at its opposite ends with said forward and rearward coupling elements, respectively;

a second elongated vertically deflectable and horizontally rigid spring element rigidly connected at one end thereof with said forward coupling element and extending rearwardly therefrom in overlying relation to said first spring element; and means connected in lift force transmitting relation with the rear end of said second spring element for transmitting lifting power thereto from said tractor mounted power lift element.

10. A hitch as set forth in claim 9, wherein said rearward coupling element has a bore adapted to receive a pivot pin for connecting said rearward coupling element in said draft transmitting, horizontally swingable and vertically rigid relation with said drawn ground engaging structure.

11. A hitch for use with a tractor having a draft transmitting coupling element and an up and down swingable power lift element mounted thereon, said hitch comprising:

a forward coupling element adapted for connection in vertically swingable relation with said tractor mounted coupling element;

a rearward coupling element adapted for connection in draft transmitting, vertically rigid relation with a drawn ground engaging structure;

an elongated, vertically deflectable and horizontally rigid spring element rigidly connected at its opposite ends with said forward and rearward coupling elements, respectively;

a bar element rigidly connected at one end thereof with said forward coupling element and extending rearwardly therefrom in overlying relation to said spring element; and means connected in lift force transmitting relation with the rear end of said bar element for transmitting lifting power thereto from said tractor mounted power lift element.

References Cited by the Examiner

UNITED STATES PATENTS

| | | | |
|---|---|---|---|
| 2,919,754 | 1/60 | Walberg | 172—7 |
| 2,930,630 | 3/60 | Tanke | 280—406 |
| 2,996,126 | 8/61 | Voegeli | 172—677 X |

PHILIP ARNOLD, *Primary Examiner.*

LEO FRIAGLIA, *Examiner.*